(12) United States Patent
Nuhn

(10) Patent No.: US 8,191,202 B2
(45) Date of Patent: *Jun. 5, 2012

(54) MOBILE VACUUM APPARATUS FOR COLLECTION OF LIQUID OR SEMI-LIQUID MATERIALS

(75) Inventor: Dennis Nuhn, Sebringville (CA)

(73) Assignee: Nuhn Industries Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,163

(22) Filed: Aug. 4, 2010

(65) Prior Publication Data

US 2011/0023259 A1  Feb. 3, 2011

Related U.S. Application Data

(63) Continuation of application No. 11/113,303, filed on Apr. 25, 2005, now Pat. No. 7,797,789.

(51) Int. Cl.
  *A47L 5/00* (2006.01)
  *E01H 1/08* (2006.01)
  *C12M 1/00* (2006.01)

(52) U.S. Cl. ............. 15/340.1; 15/401; 15/419; 15/421; 435/289.1; 435/290.1; 435/298.1

(58) Field of Classification Search ................ 15/340.1, 15/401, 419, 421; 435/289.1, 290.1, 298.1; *A47L 5/00; E01H 1/08; C12M 1/00*
See application file for complete search history.

(56) References Cited

U.S. PATENT DOCUMENTS

| | | |
|---|---|---|
| 2,973,544 A | 3/1961 | Romaniuk |
| 3,040,785 A | 6/1962 | Grindle |
| 3,406,423 A | 10/1968 | Young |
| 3,585,670 A | 6/1971 | MacKinnon |
| 4,218,226 A | 8/1980 | Boozer |
| 5,010,620 A | 4/1991 | Young |
| 5,226,757 A | 7/1993 | Tarrant |
| 5,317,783 A | 6/1994 | Williamson |
| 6,092,261 A | 7/2000 | Boomgaarden |

FOREIGN PATENT DOCUMENTS

| | | |
|---|---|---|
| CA | 2017587 A1 | 12/1990 |
| GB | 1530904 | 11/1976 |

OTHER PUBLICATIONS

Loewen Welding & Manufacturing Ltd., 'Honey-Vac—Tractor Pull', <www.loewanwelding.com/hv-tp.html>, Feb. 28, 2005.

Mar. 1997 Advertisement for the Loewen Honey-Vac which in the advertisement is being sold by Yardley Equipment Inc.

(Continued)

*Primary Examiner* — David Redding

(74) *Attorney, Agent, or Firm* — Katten Muchin Rosenman LLP

(57) ABSTRACT

The apparatus comprises a vacuum tank with a front-mounted collection means thereunder The collection means is a V-shaped scraper with a height adjustable suction inlet at the apex thereof. The collection means has a pair of laterally adjustable pivoting wings for varying its width to correspond to that of an alley or gutter. The suction inlet may be equipped with a snorkel to introduce a small quantity of air as an aid in entraining thick-consistency materials. A blower vac is used to both draw air into and blow air through the vacuum tank. A valve means comprising a pair of oppositely oriented check valves is used to alternate flow paths between a lowered rearward exhaust during collection and an elevated intake during tank discharge.

21 Claims, 7 Drawing Sheets

OTHER PUBLICATIONS 1991 photo of a Manure wagon.
1991 photo of the front portion of a manure wagon.
1988 photo of a manure wagon.
1981 photo of a truck with a tank on the back.
Advertisement for a used 1999 Tonalis 16500 Liquid manure spreader from the web site for Agriaffaires.co.uk at <http://www.agriaffaires.co.uk/used/liquid-manure-spreader/1237119/tonalis-16500.html> retrieved on Jun. 15, 2010.
Advertisement for a used 2003 Agrimat Challenger CHE80 Liquid manure spreader from the web site for Agriaffaires.co.uk at <http://www.agriaffaires.co.uk/used/liquid-manure-spreader/1261198/agrimat-challenger-che80.html> retrieved on Jun. 15, 2010.
Advertisement for a used 1997 Agrimat TCH18 Liquid manure spreader from the web site for Agriaffaires.co.uk at <http://www.agriaffaires.co.uk/used/liquid-manure-spreader/1295510/agrimat-tch18.html> retrieved on Jun. 15, 2010.
Advertisement for a used 2001 Mauguin ELESCH Liquid manure spreader from the web site for Agriaffaires.co.uk at <http://www.agriaffaires.co.uk/used/liquid-manure-spreader/1297722/mauguin-elesch.html> retrieved on Jun. 15, 2010.
Advertisement for a used 2005 Sodimac Liquid manure spreader from the web site for Agriaffaires.co.uk at <http://www.agriaffaires.co.uk/used/liquid-manure-spreader/1303182/sodimac.html> retrieved on Jun. 15, 2010.
Advertisement for a used 2001 Agrimat SK 50 Liquid manure spreader from the web site for Agriaffaires.co.uk at <http://www.agriaffaires.co.uk/used/liquid-manure-spreader/1309125/agrimat-sk-50.html> retrieved on Jun. 15, 2010.
Advertisement for a used 1995 Joskin KOMFORT 1200TS Liquid manure spreader from the web site for Agriaffaires.co.uk at <http://www.agriaffaires.co.uk/used/liquid-manure-spreader/1309488/joskin-komfort-12000ts.html> retrieved on Jun. 15, 2010.
Advertisement for a used 2005 Mauguin Liquid manure spreader from the web site for Agriaffaires.co.uk at <http://www.agriaffaires.co.uk/used/liquid-manure-spreader/1320221/mauguin.html> retrieved on Jun. 15, 2010.
Advertisement for a used 1999 Desmares TL 15000 Liquid manure spreader from the web site for Agriaffaires.co.uk at <http://www.agriaffaires.co.uk/used/liquid-manure-spreader/1331312/desmares-tl-15000.html> retrieved on Jun. 15, 2010.
Advertisement for a used 2001 Miro CP 1324 Liquid manure spreader from the web site for Agriaffaires.co.uk at <http://www.agriaffaires.co.uk/used/liquid-manure-spreader/1339597/miro-cp-1324.html> retrieved on Jun. 15, 2010.
Advertisement for a used 2002 Agrimat TANKER CH 150 Liquid manure spreader from the web site for Agriaffaires.co.uk at <http://www.agriaffaires.co.uk/used/liquid-manure-spreader/1344984/agrimat-tanker-ch-150.html> retrieved on Jun. 15, 2010.
Advertisement for a used 2005 Jeantil GT 11500 Liquid manure spreader from the web site for Agriaffaires.co.uk at <http://www.agriaffaires.co.uk/used/liquid-manure-spreader/1346548/jeantil-gt-11500.html> retrieved on Jun. 15, 2010.
Advertisement for a used 1999 Tonalis 8800 Liquid manure spreader from the web site for Agriaffaires.co.uk at <http://www.agriaffaires.co.uk/used/liquid-manure-spreader/1358948/tonalis-8800.html> retrieved on Jun. 15, 2010.
Advertisement for a used 1997 Mauguin 15500 Liquid manure spreader from the web site for Agriaffaires.co.uk at <http://www.agriaffaires.co.uk/used/liquid-manure-spreader/1224568/mauguin-15500.html> retrieved on Jun. 15, 2010.
Advertisement for a used 1997 Agrimat TPS100Tanker Liquid manure spreader from the web site for Agriaffaires.co.uk at <http://www.agriaffaires.co.uk/used/liquid-manure-spreader/1352461/agrimat-tps100tanker.html> retrieved on Jun. 15, 2010.
Advertisement for a used 1998 Armor 11500 Liquid manure spreader from the web site for Agriaffaires.co.uk at <http://www.agriaffaires.co.uk/used/liquid-manure-spreader/1350301/armor-11500.html> retrieved on Jun. 15, 2010.
Advertisement for a used 2002 Samas Liquid manure spreader from the web site for Agriaffaires.co.uk at <http://www.agriaffaires.co.uk/used/liquid-manure-spreader/1329204/samas.html> retrieved on Jun. 15, 2010.
Advertisement for a used 2002 Tonalis RE 800 Liquid manure spreader from the web site for Agriaffaires.co.uk at <http://www.agriaffaires.co.uk/used/liquid-manure-spreader/1231112/tonalis-re-800.html> retrieved on Jun. 15, 2010.
Advertisement for a used 1998 Miro TA 76 Liquid manure spreader from the web site for Agriaffaires.co.uk at <http://www.agriaffaires.co.uk/used/liquid-manure-spreader/1204918/miro-ta-76.html> retrieved on Jun. 15, 2010.
Advertisement for a used 1996 Joskin 10000 Liquid manure spreader from the web site for Agriaffaires.co.uk at <http://www.agriaffaires.co.uk/used/liquid-manure-spreader/1196272/joskin-10000.html> retrieved on Jun. 15, 2010.
Advertisement for a used 2005 Mauguin 11500 Liquid manure spreader from the web site for Agriaffaires.co.uk at <http://www.agriaffaires.co.uk/used/liquid-manure-spreader/1156187/mauguin-11500.html> retrieved on Jun. 15, 2010.
Advertisement for a used 2003 Dome APL11000 Liquid manure spreader from the web site for Agriaffaires.co.uk at <http://www.agriaffaires.co.uk/used/liquid-manure-spreader/1187426/dome-apl11000.html> retrieved on Jun. 15, 2010.
Advertisement for a used 1999 Agrimat CHEE 80 Liquid manure spreader from the web site for Agriaffaires.co.uk at <http://www.agriaffaires.co.uk/used/liquid-manure-spreader/1181261/agrimat-chee-80.html> retrieved on Jun. 15, 2010.
Advertisement for a used 1991 Joskin et 10000 Liquid manure spreader from the web site for Agriaffaires.co.uk at <http://www.agriaffaires.co.uk/used/liquid-manure-spreader/1177872/joskin-10000.html> retrieved on Jun. 15, 2010.
Advertisement for a used 2002 Miro TA88 Liquid manure spreader from the web site for Agriaffaires.co.uk at <http://www.agriaffaires.co.uk/used/liquid-manure-spreader/1145597/miro-ta88.html> retrieved on Jun. 15, 2010.
Advertisement for a used 1996 Godimat TC 15500 Liquid manure spreader from the web site for Agriaffaires.co.uk at <http://www.agriaffaires.co.uk/used/liquid-manure-spreader/210783/godimat-tc15500.html> retrieved on Jun. 15, 2010.
Advertisement for a used 2004 Joskin Quadra 2000 TS Liquid manure spreader from the web site for Agriaffaires.co.uk at <http://www.agriaffaires.co.uk/used/liquid-manure-spreader/1140231-joskin-quadra-2000-ts.html> retrieved on Jun. 15, 2010.
Advertisement for a used 2000 Sodimac TRANSAL 121E Liquid manure spreader from the web site for Agriaffaires.co.uk at <http://www.agriaffaires.co.uk/used/liquid-manure-spreader/1050158/sodimac-transal-121e.html> retrieved on Jun. 15, 2010.
Advertisement for a used 2005 Mauguin Liquid manure spreader from the web site for Agriaffaires.co.uk at <http://www.agriaffaires.co.uk/used/liquid-manure-spreader/1038133/mauguin.html> retrieved on Jun. 15, 2010.
Advertisement for a used 1995 Joskin 7000S Liquid manure spreader from the web site for Agriaffaires.co.uk at <http://www.agriaffaires.co.uk/used/liquid-manure-spreader/975557/joskin-7000s.html> retrieved on Jun. 15, 2010.
Advertisement for a used 1998 Joskin KOMFORT 11000S Liquid manure spreader from the web site for Agriaffaires.co.uk at <http://www.agriaffaires.co.uk/used/liquid-manure-spreader/965377/joskin-komfort-11000s.html> retrieved on Jun. 15, 2010.
Advertisement for a used 2000 Samas S 100 B Liquid manure spreader from the web site for Agriaffaires.co.uk at <http://www.agriaffaires.co.uldused/liquid-manure-spreader/958190/samas-s-100-b.html> retrieved on Jun. 15, 2010.
Advertisement for a used 1997 Mauguin ELESCHM8500 Liquid manure spreader from the web site for Agriaffaires.co. uk at <http://www.agriaffaires.co.uk/used/liquid-manure-spreader/921887/mauguin-eleschm8500.html> retrieved on Jun. 15, 2010.
Advertisement for a used 1998 Agrimat CHE 110 Liquid manure spreader from the web site for Agriaffaires.co.uk at <http://www.agriaffaires.co.uk/used/liquid-manure-spreader/808207/agrimat-che-110.html> retrieved on Jun. 15, 2010.

Advertisement for a used 1995 Joskin KOMFORT 10000 Liquid manure spreader from the web site for Agriaffaires.co.uk at <http://www.agriaffaires.co.uk/used/liquid-manure-spreader/210792/joskin-komfort-10000.html> retrieved on Jun. 15, 2010.

Advertisement for a used 2004 Kaweco Senior 17.000 L slurry tanker from the web site for tractorpool.de at <https://secure.tractorpool.co.uk/search/detail/print/machine_id/1275772> retrieved on Jun. 15, 2010.

Drawings for Honey Vac. Tandem Axel Trailer 10" Boom Model 5000 from Loewen Welding Mfg.

Advertisement and specifications for the Jiffy Biffy-Wagon which is manufactured by Kuelker's Manufactuing Ltd.

Apr. 16, 2010 letter from Aiyaz A. Alibhai to T. Gary O'Neill.

Jun. 21, 2010 letter from Aiyaz A. Alibhai to Mr. Dennis Nuhn et al.

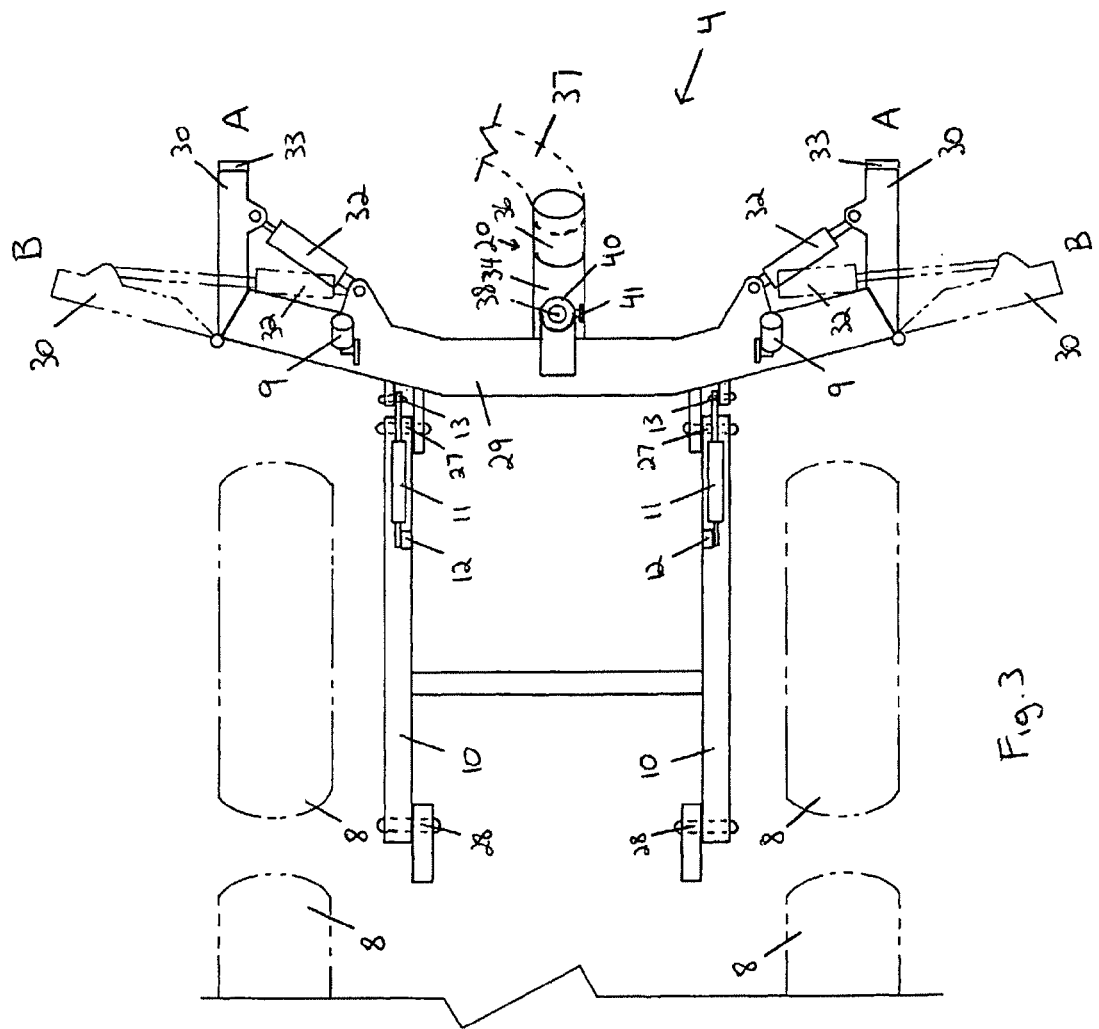

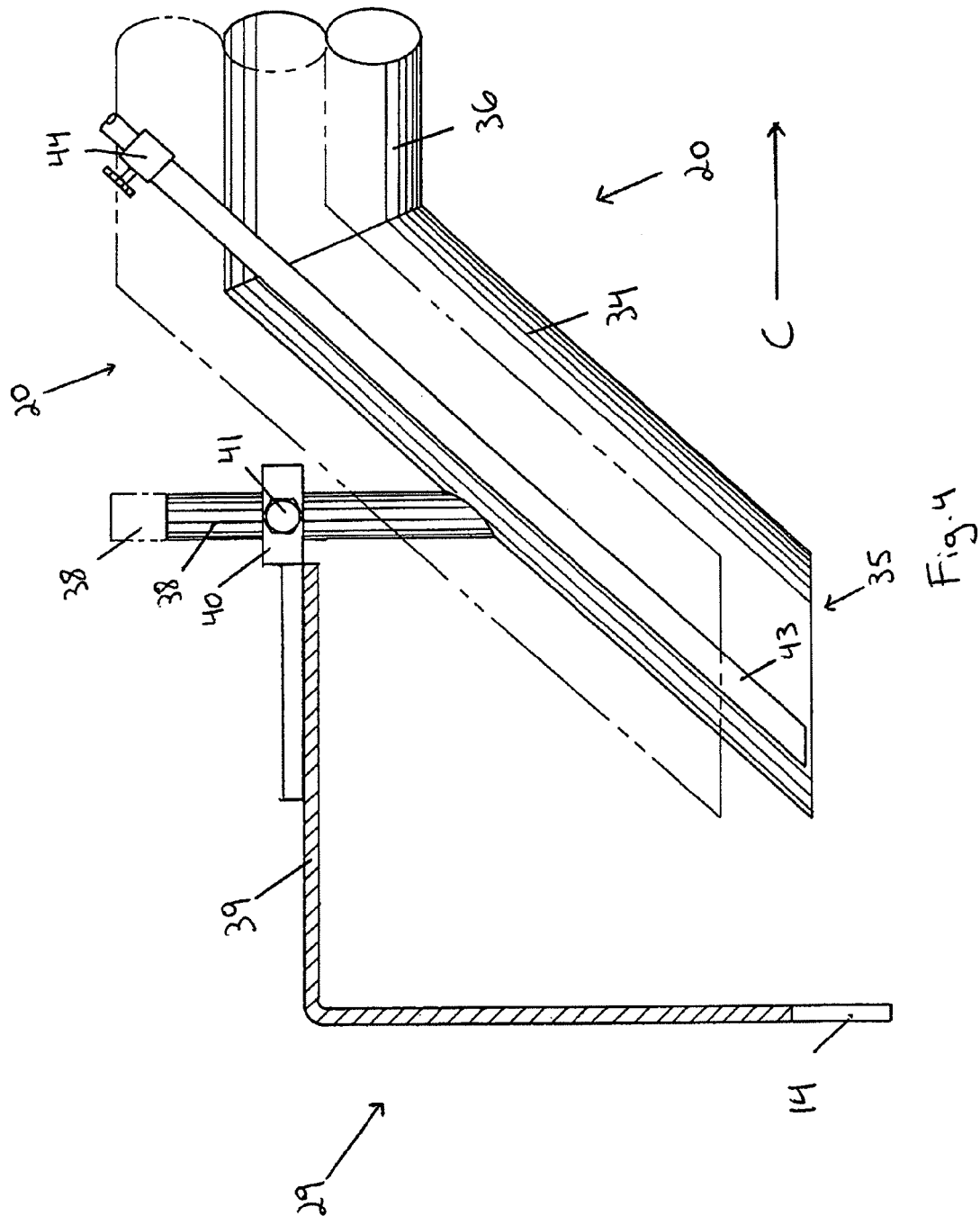

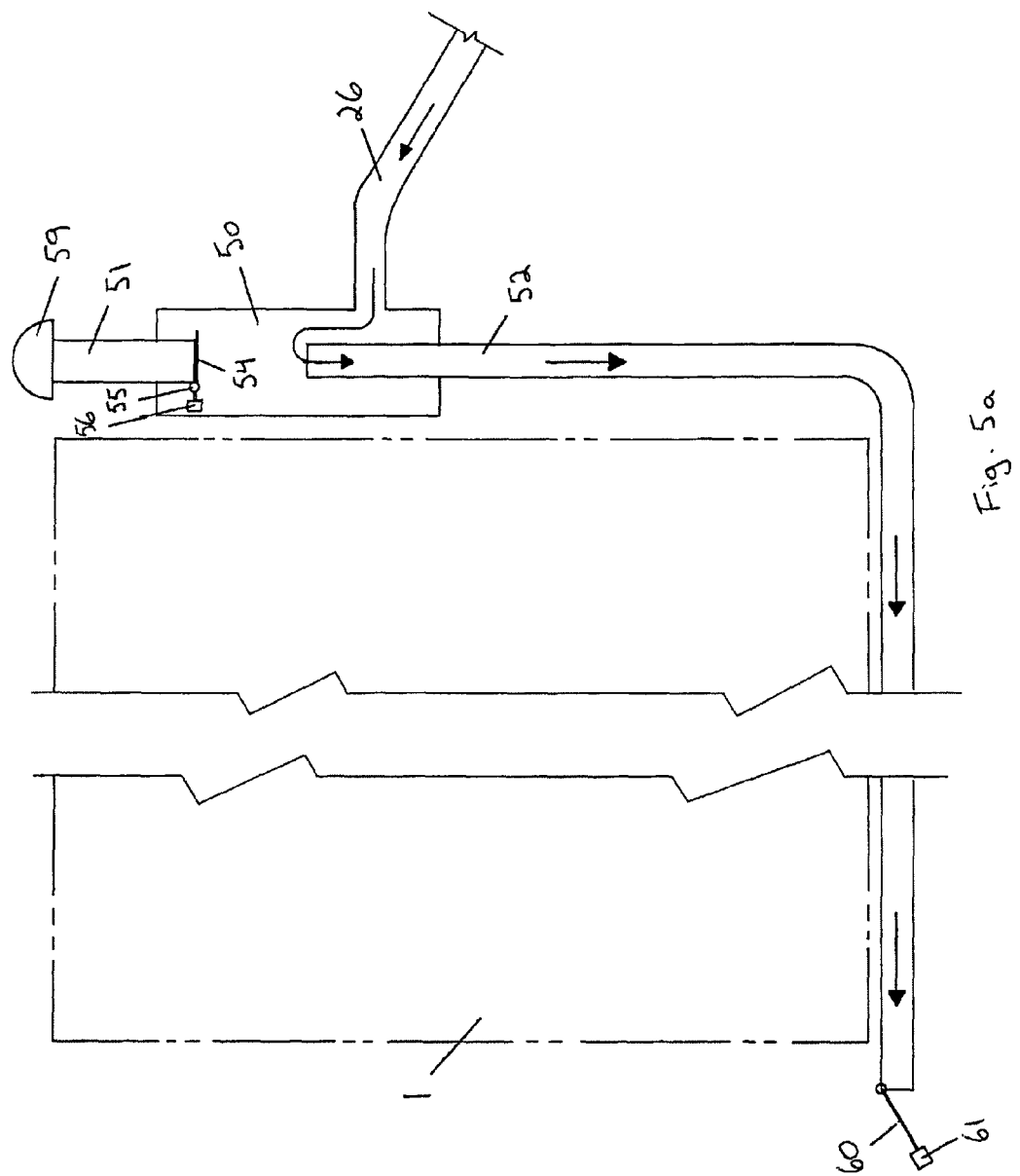

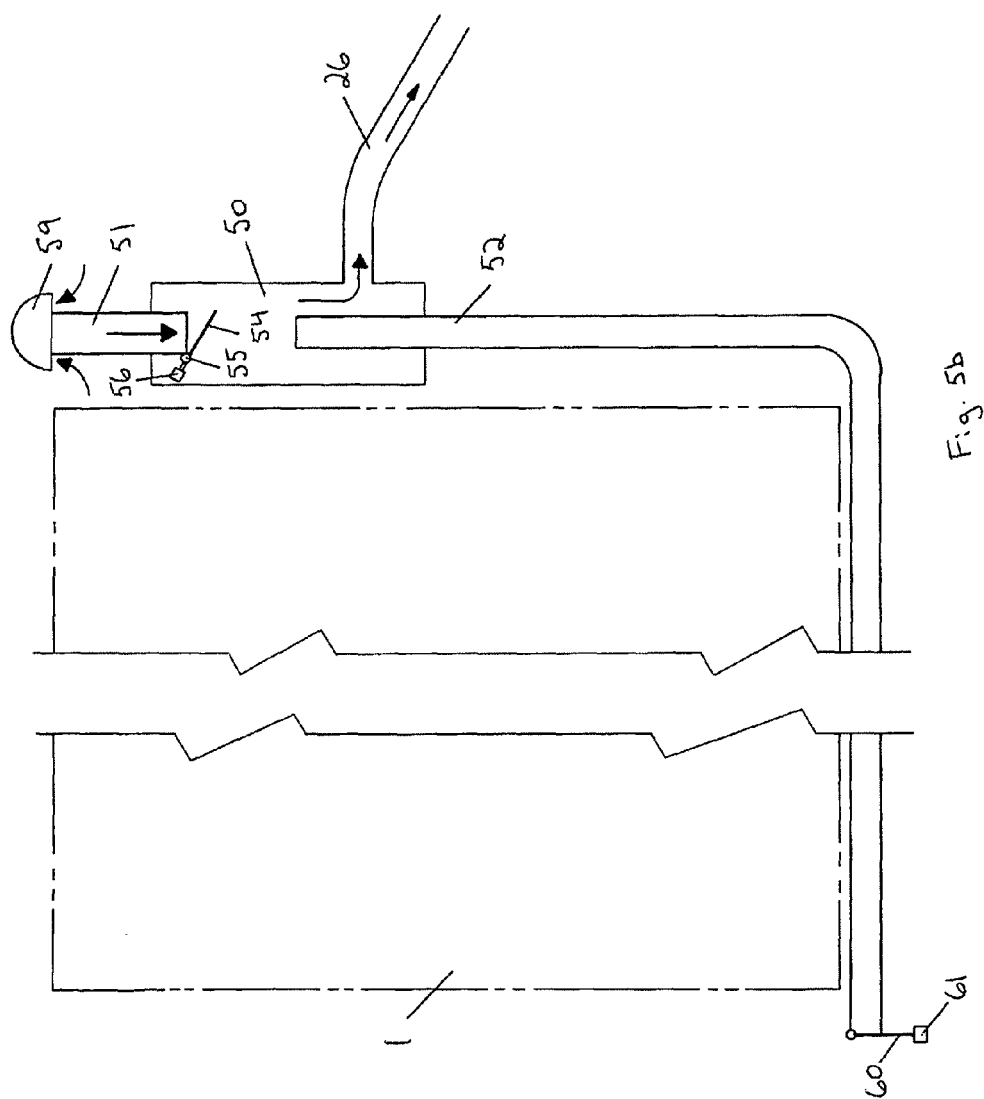

MOBILE VACUUM APPARATUS FOR COLLECTION OF LIQUID OR SEMI-LIQUID MATERIALS

This application is a continuation of U.S. patent application Ser. No. 11/113,303, filed Apr. 25, 2005, now U.S. Pat. No. 7,797,789, issued Sep. 21, 2010, the contents of which is incorporated herein by reference.

FIELD OF THE INVENTION

The invention relates to the mobile pneumatic collection of liquid or semi-liquid materials such as animal manure. More specifically, the invention relates to a mobile vacuum apparatus having a collection means mounted thereunder that directs the liquid or semi-liquid materials into a suction inlet when the apparatus is driven through the materials.

BACKGROUND OF THE INVENTION

Animal husbandry facilities, such as dairy or hog barns, include alleys or gutters for manure collection. Vehicles such as tractors or skid-steer loaders are equipped with scraper blades or front-end bucket systems to transfer manure accumulated in the alley or gutter to one end of the barn for removal and disposal. The manure is typically liquid or semi-liquid and is often difficult to transfer in this manner, as it escapes around the sides of the scraper blade or bucket. In addition, with the very large facilities that are becoming quite common in modern dairy farming, sometimes with an overall length in excess of 1000 feet, the quantity of accumulated material is too great to transfer to one end of the facility. As a result, there is a need for improvements in the collection and removal of manure from animal husbandry facilities.

Pneumatic collection of agricultural debris is used in a variety of operations both on and off the farm. For example, in the clean-up of spills of dry solid materials, such as grain or agricultural chemicals like fertilizer, vacuums are employed to pneumatically transfer the spilled materials to a storage container. An example of such a vacuum apparatus is provided in U.S. Pat. No. 4,218,226. These types of machines are not particularly well-suited to the collection of liquid or semi-liquid materials such as animal waste. Moreover, they lack any type of collection means for mounting beneath the apparatus to direct the collected material to the suction inlet when the apparatus is driven over the material, making them difficult to use in large scale mobile cleanup operations. Vacuum systems have been used for mobile cleanup of relatively dry manure, such as chicken and horse manure. U.S. Pat. No. 5,010,620 discloses a stall and pasture vacuum machine that includes a front mounted sled comprising a rotary brush. A mist of water may be provided to soften the manure and make it more amenable to pneumatic conveying. The collected manure is stored in a dump box with a hinged rear door. This machine is not suitable for the cleanup of liquid or semi-liquid materials.

Vacuum systems have been used in the clean-up of liquid and semi-liquid animal waste. U.S. Pat. No. 3,585,670 discloses an apparatus comprising a vacuum tank and a rear-mounted V-shaped scraper blade. However, in mounting the scraper blade at the rear of the apparatus, the manure is compacted prior to being collected, making it difficult to separate from the barn floor and difficult to convey pneumatically.

Another vacuum apparatus for the collection of liquid or semi-liquid manure is manufactured by Loewen Welding & Manufacturing (Matsqui, BC, Canada) under the trade-name Honey-Vac®. In this apparatus, the collected manure enters the back of the vacuum tank from the top thereof. Since the collected manure is also discharged from the back, there is no complete flushing from front to rear during discharge. This leads to an accumulation of manure in the front of the tank that diminishes tank capacity after repeated use. The accumulated manure must be periodically cleaned out through manual access hatches, which is a dangerous and unpleasant task. Also, the apparatus makes use of separate blower and vacuum pumps, which creates mechanical complexity and increases down time.

As a result, there remains a need for an improved material collection apparatus, particularly for liquid and semi-liquid materials such as animal manure.

SUMMARY OF THE INVENTION

According to an aspect of the present invention, there is provided a mobile vacuum apparatus for collection of liquid or semi-liquid materials, the apparatus comprising: a frame having a front and rear; a set of wheels mounted under the frame; a vacuum tank for receiving collected liquid or semi-liquid materials, the vacuum tank having a vacuum inlet at a front thereof and a vacuum outlet at a top thereof; a collection means comprising a scraping element mounted under the front of the frame, the collection means in fluid communication with the vacuum inlet; a discharge outlet at a rear of the tank; and, a blower vac capable of drawing air from the vacuum tank through the vacuum outlet to thereby create a vacuum in the tank.

According to another aspect of the invention, there is provided a mobile vacuum apparatus for collection of liquid or semi-liquid materials, the apparatus comprising: a frame having a front and rear; a set of wheels mounted under the frame; a vacuum tank for receiving collected liquid or semi-liquid materials, the vacuum tank having a vacuum inlet at a front thereof and a vacuum outlet at a top thereof; a collection means in fluid communication with the vacuum inlet; a discharge outlet rearward of the collection means; a blower vac selectively capable of either drawing air from the vacuum tank through the vacuum outlet to thereby create a vacuum in the tank or blowing air into the vacuum tank to thereby expel the collected liquid or semi-liquid materials therefrom under pressure through the discharge outlet; and, a valve means for directing air to a blower vac exhaust when drawing air from the vacuum tank and for supplying air from an elevated blower vac intake when blowing air into the vacuum tank.

The apparatus is mobile and may be either pulled by a towing vehicle or self-propelled. The towing vehicle may be a farm tractor and the apparatus is particularly suitable for agricultural use. The apparatus is designed to be driven over the material to be collected with the collection means in front to reduce compaction of the material being collected. The material being collected may be any type of liquid or semi-liquid material suitable for pneumatic conveying. The material may comprise liquid waste. The material may comprise animal manure, such as manure from cows or pigs, and the animal manure may be in a semi-liquid state. The apparatus may be adapted for use in an animal husbandry facility, such as a dairy barn or milking shed, particularly such a facility that includes alleys or gutters for collection of manure.

It is desirable that the collected material is prevented from entering the blower vac, as obstruction of its internal moving parts can cause significant damage to the blower vac. The vacuum tank includes a vacuum outlet that may comprise two or more vacuum outlets spaced apart along the top of the tank. By using two or more vacuum outlets, the velocity through each outlet is decreased, thereby reducing the likelihood that the collected material can become entrained in the air flowing through the outlets. The outlets may be of the same size or different sizes in order to preferentially direct the collected material to different parts of the tank. Each outlet may include a primary trap to further reduce the likelihood of material escaping through the vacuum outlet, particularly when the tank is full. Any suitable primary trap design may be used and the primary trap is preferably readily cleaned by reducing the air flow through the vacuum outlet.

Air flowing from the vacuum outlet may be directed to a secondary trap for yet further reducing the likelihood that entrained debris will enter the blower vac. The secondary trap may be of any suitable design and may comprise a chamber containing a series of baffle plates that are arranged to create a serpentine path. Alternatively, the chamber may contain a plurality of perforated impingement plates stacked with the perforations in an offset relationship. The secondary trap may be similar to a knock-out pot in that it may be designed for the removal of liquid from the air flow, particularly liquid droplets. The secondary trap may be cleaned by reversing the direction of air flow through the trap and may be additionally or alternatively cleaned using a supplemental stream of air or water to flush out the contents of the trap. The secondary trap may include a drain and the drain may be directed back into the vacuum tank. The outlet of the secondary trap is preferably free of collected material or droplets and is provided to the blower vac.

The blower vac may be powered by a motor of the towing vehicle or by a motor mounted on the apparatus itself. A separate motor may be used to independently power the blower vac. The towing vehicle may be connected to the blower vac using a power take-off (PTO) mechanism. The blower vac may comprise a single unit or two separate but connected units. The blower vac may comprise two chambers connected to a single power source. The blower vac may comprise an internal valve that permits the flow path through the blower vac to be altered in order to switch the intake port of the blower vac to the exhaust port and vice versa. The blower vac may be reversible in order to alternate intake and exhaust ports. The blower vac may comprise a positive displacement pump, such as a rotary vane pump. The blower vac may be in fluid communication with a valve means.

The valve means may be used as part of any liquid or semi-liquid material collection system that both draws and expels material pneumatically. The valve means may be automatically adjustable or manually adjustable. The valve means may comprise a three-way valve mechanism that permits selection of a single flow path from two different flow paths, for example and L-ported ball valve that may be alternated between two flow paths. The valve means may comprise a pair of check valves, one check valve in each of the intake and exhaust flow paths. The check valves may be oppositely oriented to permit air to flow into the valve means through only one flow path (the intake flow path) and out of the valve means by only the other flow path (the exhaust flow path). In this manner, the valve means is automatically adjustable in response to a change in the direction of flow through the blower vac. The valve means may include a valve chamber and the check valves need not necessarily both be located in the valve chamber. The valve means is particularly advantageous in allowing an air intake and exhaust of the system to be separated, thereby permitting the intake to be elevated with respect to the material being collected and the exhaust to be located distantly from the operator. The elevated exhaust reduces the likelihood of debris entering the blower vac when blowing air into the tank and the distant exhaust improves operator health and safety.

The collection means may be any suitable mechanism for directing the material toward the pneumatic collection inlet and may include, for example a brush, rotating brush, scraper, squeegee, air blast, water jet, or a combination thereof. The scraper may comprise a scraping element made from a rigid yet flexible material, such as a high durometer or reinforced rubber. The collection means may be height adjustable and may be either self-leveling or manually level adjusted with respect to the material collection surface. The suction inlet of the pneumatic collection system may be through a distribution means to permit collection across the width of the collection means or collection may occur at a discrete point or points. The collection means may have a shape adapted for funneling the material toward the suction inlet, for example a V-shape when seen in plan view.

The suction inlet may be height adjustable independently of any height adjustment of the collection means in response to the quantity of material being collected; this permits a scraping element of the collection means to remain in contact with the floor surface while allowing the suction inlet to be adjusted relative in height thereto in response to a large quantity of material being collected. Any suitable mechanism may be employed to adjust the height of the suction inlet. The suction inlet is preferably connected to the vacuum inlet by a flexible connection in order to facilitate the height adjustment. By setting the suction inlet closer to the floor surface that the material is being collected from more material may be collected, thereby leaving less material in the collection means at the end of a pass through an alley. However, if set close to the floor, the suction inlet will have more material to pick-up and driving speed may have to be reduced. There is therefore an optimal trade-off between speed and completeness of collection. A snorkel may be provided alongside the suction inlet for introducing a small quantity of air into the material as it is being collected. This small quantity of air is entrained with the material and makes it easier to lift from the floor and easier to pneumatically convey, particularly for materials with a thick consistency. The snorkel may include a small valve to set the quantity of air provided to the suction inlet according to the consistency of the material being collected.

The collection means may include a variable width mechanism. The variable width mechanism is particularly useful in the collection of manure from alleys or gutters, as it allows the collection means to fit the width of the alley or gutter and reduces the likelihood of manure escaping around the sides of the collection means. The collection means may include wings that are pivotally attached to each side of the collection means and able to pivot about a vertical pivot axis. The wings may be biased outwardly towards or against the sidewalls of the alley or gutter and may resiliently adapt to changes in the width of the gutter by pivoting about the vertical pivot axis. The wings may move about the vertical pivot axis in response to a change in the distance between the side-wall of the alley and the collection means. The wings may be biased by a spring means or a suitable fluid cylinder arrangement, such as a pneumatic or hydraulic fluid displacement cylinder, a captive gas shock absorber, or a combination thereof. The wings may automatically adjust to the width of the alley or gutter or may be manually adjusted by an operator of the apparatus. The adjustment may be conducted using controls within the towing vehicle. The wings may include skid plates or wear strips to reduce the likelihood of damaging the wings due to operator driving error.

The discharge outlet is provided at the rear of the vacuum tank. The discharge outlet may be connected to any manure distribution system suitable for liquid or semi-liquid manure, such as a spreader plate or sub-surface injection system. Alternatively, the discharge outlet may be connected via a fluid conduit for transferring the manure to a separate spreading apparatus or a holding vessel. The vacuum inlet is provided at the front of the tank, preferably in a lower half thereof below the horizontal midline of the tank. Filling the tank from the front and discharging the tank through the rear causes a flushing of the collected materials through the tank. This causes substantially all of the material in the tank to be discharged and mitigates material build-up in the front of the tank. During collection, a remotely operable valve on the discharge outlet is closed to prevent inadvertent leakage from occurring. During tank discharge, a remotely operable valve on the vacuum inlet is closed to prevent material from being discharged through the collection means.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 3 is a top view of the collection means of the present invention;

FIG. 4 is a side view of the height adjustable suction inlet of the present invention;

FIG. 5a is a schematic side view of the valve means of the present invention while air is being drawn from the vacuum tank; and, FIG. 5b is a schematic side view of the valve means of the present invention while air is being blown into the vacuum tank.

DESCRIPTION OF PREFERRED EMBODIMENTS

Figure 1A:
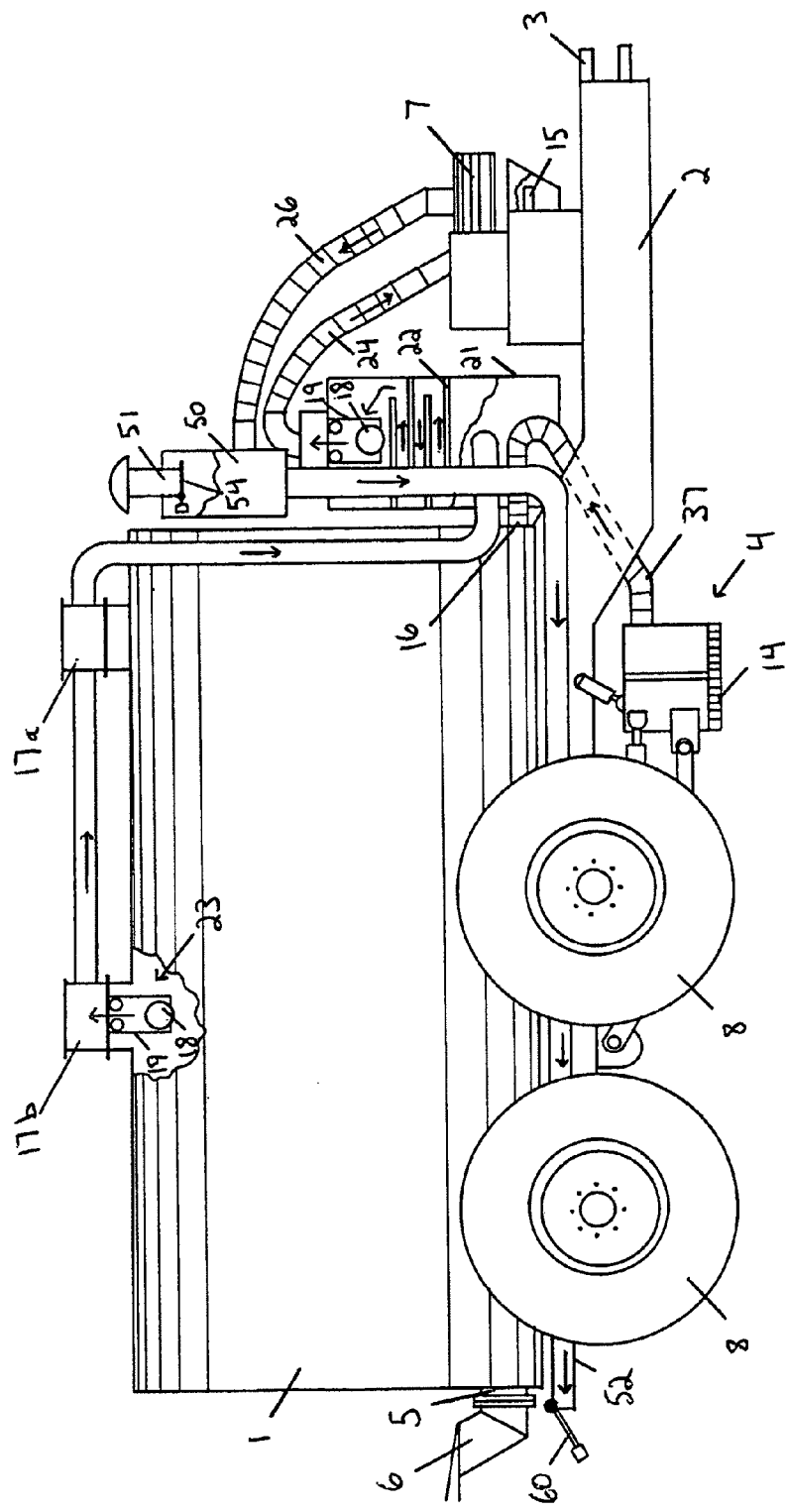
FIG. 1a is a side view of the apparatus according to the present invention showing a flow path through the apparatus when material is being collected.

In describing the figures, like features are referred to by like reference numerals. Although not all features indicated on a particular drawing are necessarily described with reference to that drawing, all of the features are described with reference to at least one of the drawings.

Figure 1B:
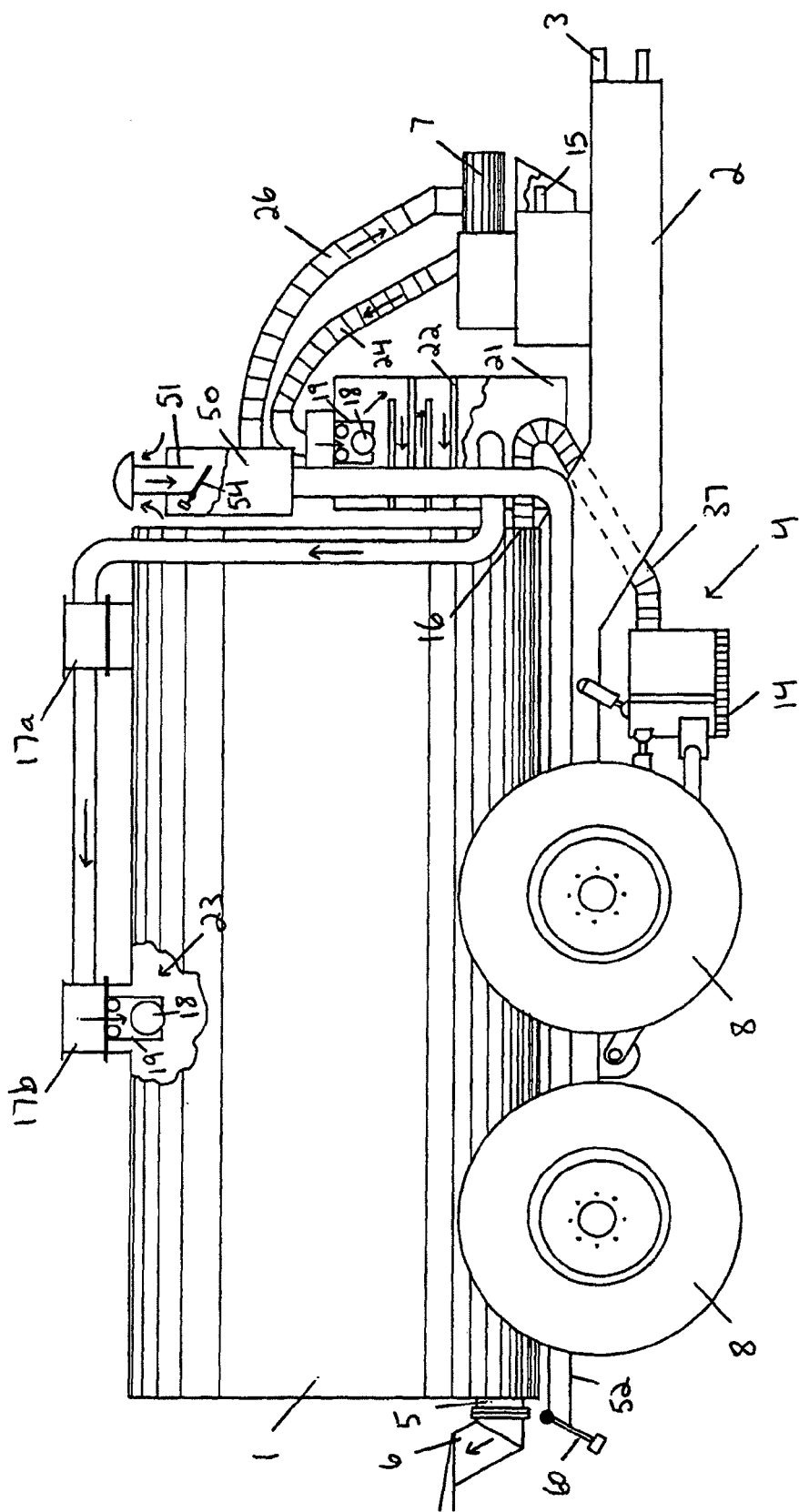
FIG. 1b is a side view of the apparatus according to the present invention showing a flow path through the apparatus when material is being discharged.

Referring to FIGS. 1a and 1b, the mobile vacuum apparatus comprises a vacuum tank 1 mounted on a frame 2 having a front and rear with a hitch means 3 for connection to a towing vehicle (not shown) at the front of the frame. A collection means 4 is mounted to the underside of the frame 2 at the front thereof, forward of a discharge outlet 5 of the vacuum tank 1. A spreader means 6 is attached to a flange on the discharge outlet 5. A set of tandem wheels 8 is mounted to the underside of the frame 2 using a walking-axle arrangement as is conventionally known.

A blower vac 7 is provided at the front of the frame 2. The blower vac 7 is a positive displacement rotary vane pump (in a preferred embodiment, a Wallenstein type pump) that can operate as either a blower or vacuum pump. The blower vac 7 is a single integrated unit capable of selectively drawing air from the vacuum tank or blowing air into the vacuum tank. An integral valve (not shown) is provided as part of the blower vac 7 to switch between drawing air from and blowing air into the vacuum tank 1. The pump derives power from the towing vehicle via a PTO shaft 15.

FIG. 1a schematically shows a flow path through the apparatus when material is being collected. The collection means 4 is lowered with respect to ground level and parallel thereto with a scraper element 14 in contact with the floor surface. Material is admitted into a suction inlet (not shown in FIGS. 1a and 1b) of the collection means 4 and drawn through suction conduit 37 into vacuum inlet 16 of vacuum tank 1. The vacuum inlet 16 is located on the front of the vacuum tank 1 in the lower half thereof below the horizontal midline of the tank. This causes the collected material to fill the tank from front to rear, improving weight distribution and facilitating substantially complete discharge. The air is then drawn out of the vacuum tank 1 through vacuum outlet 17, which comprises front vacuum outlet 17a and rear vacuum outlet 17b. The use of two vacuum outlets 17a and 17b reduces the exit air velocity by half as compared with a single outlet, significantly reducing the likelihood of debris becoming entrained and exiting through the vacuum outlet 17. Each vacuum outlet 17a and 17b is equipped with a primary trap 23 comprising a stainless steel ball float 18 captivated within a rigid mesh cage 19. The rigid mesh cage 19 helps prevent material from exiting the tank 1 through the vacuum outlet 17. As the level of material in the vacuum tank 1 rises to the top of the tank, the float 18 rises and blocks the outlet 17 to prevent material from being drawn out of the tank. The primary trap 23 therefore serves as a first line of defense in keeping the collected material within the tank 1.

Air drawn through the vacuum outlet 17 is next directed into secondary trap 21 at the bottom thereof. The secondary trap 21 includes a plurality of stacked baffles 22 arranged to create a serpentine flow path through the trap 21. This causes disengagement of any materials entrained in the air flow, particularly liquid materials which may have passed the mesh cage 18 of the primary trap 23. The secondary trap 21 includes a drain (not shown) for re-introducing any collected material back into the vacuum tank 1. The secondary trap 21 may be cleaned using supplementary flows of water or air provided through ports (not shown) at the top thereof. The exit of the secondary trap 21 is protected by a stainless steel ball float 18 captivated within a rigid mesh cage 19 in an arrangement similar to that of the primary trap 23.

Air exiting the secondary trap 21 is provided to the blower vac 7 through first blower vac conduit 24 and exits therefrom through second blower vac conduit 26. The air is provided to a valve means comprising a valve chamber 50 and pressurizes the valve chamber, causing the second closure means 60 to open and allowing the air to exit through the anterior end of blower vac exhaust 52.

In FIG. 1b, the apparatus is illustrated in a tank discharge condition. The blower vac 7 creates a negative pressure or vacuum in the valve chamber 50. This causes the first closure means 54 to open, admitting air into the valve chamber 50 through blower vac intake 51. The air then flows through the second blower vac conduit 26 into the blower vac 7, which acts to blow the air out through first blower vac conduit 25. The air flows downwardly through the secondary trap 21, back flushing any accumulated debris out through the drain (not shown) and into tank 1. The air then passes out of the bottom of the secondary trap 21 and into the vacuum outlet 17 at the top of the vacuum tank 1. The primary trap 23 is back flushed to dislodge any debris accumulated against the mesh cage 19. A positive pressure is created in the vacuum tank 1, which forces the collected material outwardly through rear discharge outlet 5. A remotely operable discharge valve (not shown) is opened during discharge to allow material to exit through the spreader means 6 and is closed during collection of material. Conversely, a remotely operable suction valve (not shown) is closed during tank discharge to prevent material from exiting through the collection means 4 and is opened during collection of material.

The introduction of air through the first vacuum outlet 17a causes material accumulated at the front of the tank to be pushed downwardly and out through the discharge outlet 5. In this manner, a complete flushing of the vacuum tank 1 occurs to expel substantially all of the material in the tank (as compared with prior art systems) reducing the need for manual cleanout of the front of the vacuum tank.

Figure 2:
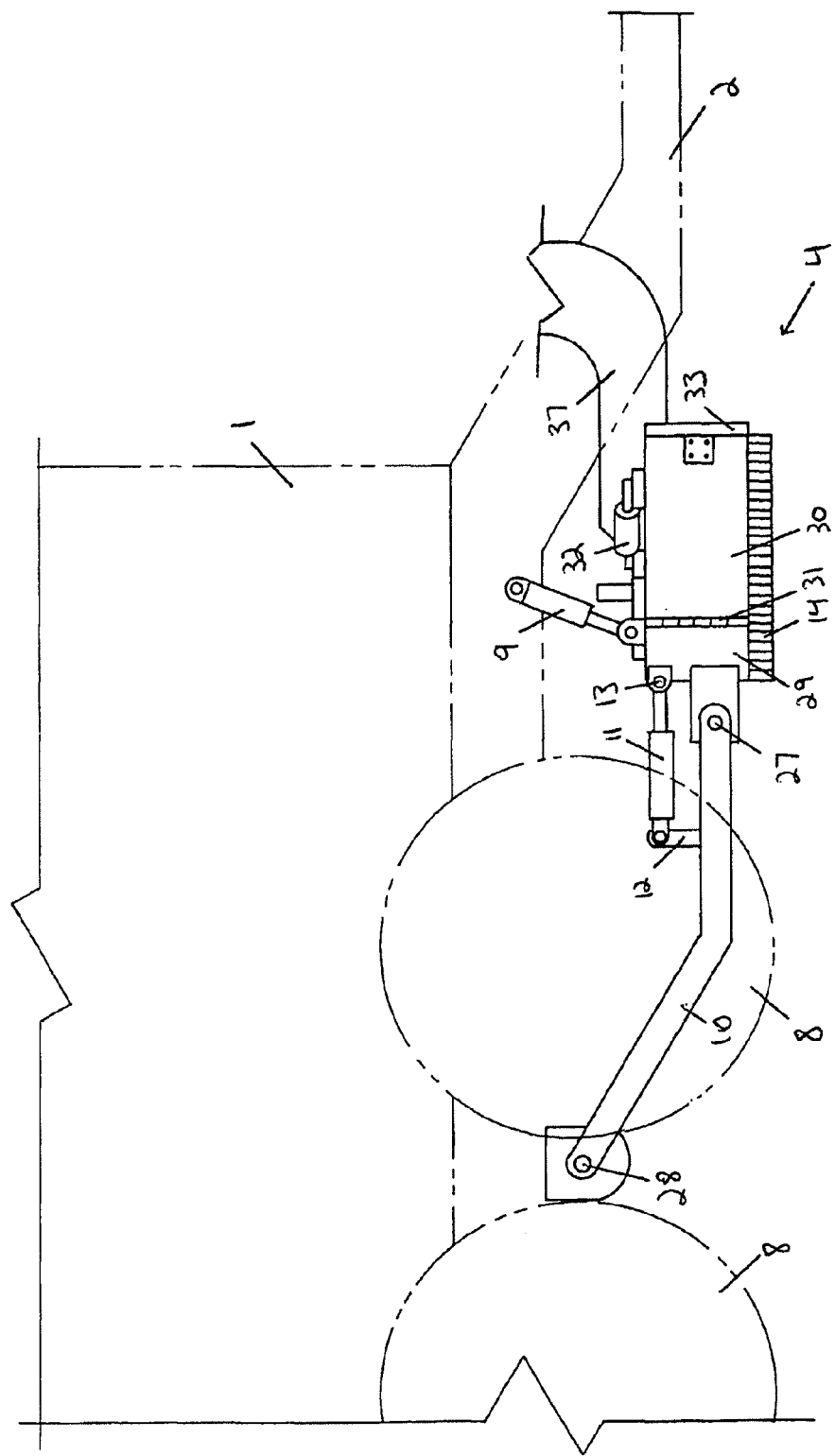
FIG. 2 is a side view of the collection means of the present invention.

Referring to FIGS. 2 and 3, the collection means 4 is pivotally mounted to the underside of the frame 2 by way of pivot arm 10. Pivot arm 10 is pivotally attached at one end to a central portion 29 of the collection means 4 at first pivot pin 27 and at the other end to the frame 2 at second pivot pin 28, which is located between the tandem wheels 8. A hydraulic lift cylinder 9 is provided between the central portion 29 and the frame 2 and may be extended or retracted to lower or raise, respectively, the collection means 4 by pivoting of the pivot arm 10 about the second pivot pin 28. The collection means 4 is typically raised when turning the apparatus to prevent damage to the collection means due to skid-induced lateral forces.

An adjustable length link 11 is pivotally attached at one end to an upwardly extending stub 12 fixedly mounted on the pivot arm 10. The other end of the link 11 is pivotally attached to the central portion 29 at link pivot 13, which is located above the first pivot pin 27. By adjusting the length of the link 11, a fine tilting adjustment of the central portion 29 may be attained so as to ensure that the scraper element 14 attached to the underside of the collection means 4 remains in contact with the floor or other surface from which the materials are being collected. The scraper element 14 comprises a high durometer rubber scraping edge with a steel reinforcement. This permits the scraping element 14 to conform somewhat to irregularities in the scraped surface while providing sufficient rigidity to remove adherent materials. The rubber scraping edge also provides a squeegee effect similar to an automotive windshield wiper that permits liquid or semi-liquid materials to be scraped.

The collection means 4 further comprises a pair of laterally adjustable wings 30 that are attached to the central portion 29 on opposite sides thereof. Each wing 30 is pivotally attached to the central portion 29 using a piano hinge 31 that allows the wing to pivot about a vertical pivot axis passing through the center of the hinge. A hydraulic wing cylinder 32 is pivotally attached to each wing 30 and to central portion 29 so that extension of the wing cylinders causes the wings to open, thereby increasing the width of the collection means 4. The wings 30 are closed by retracting the wing cylinders 32. The normal range of movement of the wings 30 is from a closed position parallel to the longitudinal axis of the apparatus (defined by its direction of travel) to an open position which is at an angle less than perpendicular to the longitudinal axis and preferably tangential to the central portion 29 at the hinges 31. FIG. 3 shows the closed position (marked A) and also shows the open position (marked B) in phantom lines. In the open position, the wings 30 extend past the wheels 8. The wings 30 are normally closed when transporting the apparatus to reduce the risk of damaging the wings.

The wings 30 may be controlled using a single circuit so that they both open and close at the same time or using separate circuits so that one or the other of the wings may be opened or closed. In addition, the wings 30 need not be completely opened, but can be set to any desired angle of opening. This is particularly advantageous when scraping a large area without side-walls. When scraping an alley or gutter with side-walls, such as in an animal husbandry facility, the wings 30 are preferably opened until a skid protector 33 attached to the distal end of each wing comes into contact with the side-wall. The skid protector 33 may be made from metal or a durable plastic, preferably a plastic with dry lubricant qualities such as Delrin®. A pressure relief valve (not shown) is provided in each hydraulic circuit of the wing cylinders 32 in order to permit the wings 30 to close by rotating about the vertical pivot axis in response to a decrease in distance between the collection means 4 and the side-wall. The valves may be adjusted to maintain a modest cylinder extension pressure so that the wings 30 return to the desired pre-set open position when the distance between the collection means 4 and the side-wall increases. The net effect is that closing of one wing 30 due to distance changes while driving is matched by a corresponding opening of the opposite wing.

A height adjustable suction inlet 20 is provided at about the center of the central portion 29. Referring to FIG. 4, the suction inlet 20 has a 45.degree. degree bend so that a lower portion 34 forms a downwardly oriented nozzle opening 35 that is roughly parallel with the floor (subject to fine level adjustment using adjustable length link 11). The upper portion 36 of the suction inlet 20 is attached one end of flexible suction conduit 37. The other end of suction conduit 37 is attached to the vacuum inlet 16 of vacuum tank 1. The flexible suction conduit 37 permits the height of the suction inlet 20 to be adjusted without constraint by the conduit. An upright post 38 is fixedly attached to the suction inlet 20. The central portion 29 has an inverted L-shaped cross-section with a top portion 39 to which a collar 40 is mounted. The collar 40 is forwardly offset from the central portion 29 and has a bore that is complementary in size to the upright post 38. The bore permits sliding passage of the upright post 38 through the collar 40. A user-adjustable set screw 41 is provided in the collar 40 for threading engagement with the upright post 38. By loosening the set screw 41, the upright post 38 is permitted to slide through the bore of the collar 40, allowing the height of the suction inlet 20 to be raised or lowered relative to ground level. Tightening the set screw 41 allows the desired height of the suction inlet 20 to be fixed. During forward travel of the apparatus in the direction indicated by arrow C, the liquid or semi-liquid material being collected accumulates within the inverted L-shaped cross section of the central portion 29 and is constrained from overflowing by the top portion 39 thereof. The height of the suction inlet 20 is typically adjusted higher for thick semi-liquid materials and lower for liquid materials.

A snorkel 43 is provided alongside the suction inlet 20. The snorkel 43 permits a small quantity of air to be introduced into the opening 35 for entrainment with the materials being collected by the suction inlet 20. It has been found that the introduction of air by the snorkel 43 is of particular use in the collection of thick semi-solid materials, as the two-phase flow produced tends to aid in pneumatically conveying the materials into the vacuum tank 1. A snorkel valve 44 may be adjusted to deliver the desired amount of air to the suction inlet 20 according to the consistency of the materials being collected.

Referring to FIGS. 5a and 5b, a valve means is schematically shown as part of the blower vac intake/exhaust system.

A valve chamber 50 is provided with an elevated blower vac intake 51 extending upwardly therefrom and a blower vac exhaust 52 extending downwardly therefrom. The second blower vac conduit 26 extends from the side of the valve chamber 50 and permits flow in either direction between the blower vac 7 and the valve chamber. The second blower vac conduit 26 is preferably provided tangentially to the valve chamber 50 and laterally offset from the vertical centerline thereof to create a swirling flow pattern and cyclonic action within the valve chamber. The valve chamber 50 can be shaped and/or include supplementary flow elements to enhance this flow pattern. The cyclonic action is used as an aid in removing dust or debris when the blower vac intake 51 is being used to supply air for blowing into the vacuum tank 1.

FIG. 5a shows the valve means in operation when drawing air from the vacuum tank 1. A first closure means 54 is pivotally attached to the lower end of the blower vac intake 51 within the valve chamber 50 by closure hinge 55. The first closure means 54 has a counterweight 56 on an opposite side of the closure hinge 55 from the blower vac intake 51. The counterweight 56 biases the first closure means 54 into a closed position to seal the end of the blower vac intake 51. The valve chamber 50 is pressurized when air is drawn from the vacuum tank 1 and the air pressure helps maintain the first closure means 54 in a closed position. The pressurized air escapes through blower vac exhaust 52. The blower vac exhaust 52 is downwardly oriented from the valve chamber 50 and is routed along the underside of the frame 2. An opening at the anterior end of the blower vac exhaust 52 directs the foul-smelling air drawn from the vacuum tank 1 downwardly and away from the operator of the apparatus, who is located in the towing vehicle attached to the front hitch means 3. This improves the overall health and safety of the operator. A second closure means 60 is pivotally attached to the anterior end of the blower vac exhaust 52. A closure weight 61 is provided to bias the second closure means 60 into a closed position over an opening in the anterior end of the blower vac exhaust 52. However, the flow of pressurized air provided from the valve chamber 50 is sufficient to overcome this bias and causes the second closure means 60 to open, thereby allowing air to escape through the opening.

Referring to FIG. 5b, the valve means is shown in operation during tank discharge when the blower vac 7 is used to blow air into the vacuum tank 1. The flow path through the second blower vac conduit 26 is reversed as compared with FIG. 5a and the valve chamber 50 is under vacuum. The vacuum overcomes the bias provided by the counterweight 56 and causes the first closure means 54 to open, admitting air into the valve chamber 50 through the blower vac intake 51. A filter 59 is provided atop the blower vac intake 51 to remove debris from the intake air stream in order to reduce the potential for damage to the blower vac 7. The negative pressure within the valve chamber 50 enhances the bias on the second closure means 60 provided by the closure weight 61 and acts to seal the blower vac exhaust 52.

By referring to FIGS. 5a and 5b, it can be seen that the first and second closure means 54 and 60 of the valve means act as oppositely oriented check valves that permit flow in only one direction through each of the blower vac intake 51 and blower vac exhaust 52. The valve means permits flow through one flow path or the other, depending on the direction of flow through the second blower vac conduit 26. The first and second closure means 54 and 60 automatically close or open according to whether air is being drawn from the vacuum tank 1 or blown into the vacuum tank 1.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A mobile vacuum apparatus for collection of liquid or semi-liquid materials, the apparatus comprising:
   a) a frame having a front and rear;
   b) a set of wheels mounted under the frame;
   c) a vacuum tank for receiving collected liquid or semi-liquid materials, the vacuum tank having (i) a vacuum inlet in a front wall thereof and (ii) two or more vacuum outlets spaced apart along a top thereof and in fluid communication with one another through a structure on an outside of the tank;
   d) collection structure comprising a scraping element mounted under the front of the frame, the collection structure in fluid communication with the vacuum inlet;
   e) a discharge outlet at a rear of the tank; and,
   f) a blower vac selectively (i) drawing air from the vacuum tank through the two or more vacuum outlets to thereby create a vacuum in the tank, or (ii) blowing air into the vacuum tank through the two or more vacuum outlets to thereby expel the collected liquid or semi-liquid materials therefrom under pressure through the discharge outlet.

2. A mobile vacuum apparatus according to claim 1, wherein the collection structure includes a pair of wings pivotally attached on opposite sides of the collection structure and movable about a vertical pivot axis to vary a width of the collection means.

3. The apparatus according to claim 2, wherein the wings are configured to (i) be biased against a side-wall of an alley and (ii) move about the vertical pivot axis in response to changes in distance between the side-wall and the collection means.

4. The apparatus according to claim 1, wherein the collection structure includes a suction inlet in fluid communication with the vacuum inlet.

5. The apparatus according to claim 4, wherein the suction inlet includes a snorkel that permits air to be entrained with the collected material entering the suction inlet.

6. The apparatus according to claim 1, wherein the vacuum inlet is at a front of the tank in a lower half thereof.

7. The apparatus according to claim 1, wherein the apparatus further comprises a valve configured to (i) direct air to a blower vac exhaust located beneath the frame when drawing air from the vacuum tank, and (ii) to supply air from a separate elevated blower vac intake located above the frame when blowing air into the vacuum tank.

8. A mobile vacuum apparatus for collection of liquid or semi-liquid materials, the apparatus comprising:
   a) a frame having a front and rear;
   b) a set of wheels mounted under the frame;
   c) a vacuum tank for receiving collected liquid or semi-liquid materials, the vacuum tank having (i) a vacuum inlet at a front thereof and (ii) at least two vacuum outlets spaced apart on a top of said tank, the at least two vacuum outlets being in fluid communication with each other through a structure separate from the portion of the tank which holds the liquid or semi-liquid materials;
   d) a collection structure comprising a scraping element mounted under the front of the frame, the collection structure in fluid communication with the vacuum inlet;
   e) a discharge outlet rearward of the collection structure;

f) a blower vac selectively (i) drawing air from the vacuum tank through the at least two vacuum outlets to thereby create a vacuum in the tank or (ii) blowing air into the vacuum tank to thereby expel the collected liquid or semi-liquid materials therefrom under pressure through the discharge outlet; and g) a valve configured to (i) direct air to a blower vac exhaust located beneath the frame when drawing air from the vacuum tank, and (ii) to supply air from a separate elevated blower vac intake located above the frame when blowing air into the vacuum tank.

9. The apparatus according to claim 8, wherein the blower vac exhaust is located at the rear of the apparatus.

10. The apparatus according to claim 8, wherein the valve comprises (i) a blower vac exhaust check valve that is closed when blowing air into the vacuum tank and (ii) a blower vac intake check valve that is closed when drawing air from the vacuum tank.

11. The apparatus according to claim 8, wherein the valve comprises a valve chamber that is pressurized when drawing air from the vacuum tank and evacuated when blowing air into the vacuum tank.

12. The apparatus according to claim 11, wherein the valve chamber has a blower vac intake at a top thereof with a first closure that opens when the valve chamber is evacuated to admit air into the valve chamber and closes when the valve chamber is pressurized to prevent air from escaping through the blower vac intake.

13. The apparatus according to claim 12, wherein the valve chamber has a blower vac exhaust at a bottom thereof with a second closure that opens when the valve chamber is pressurized to allow air to escape from the valve chamber and closes when the valve chamber is evacuated to prevent air from entering the valve chamber through the blower vac exhaust.

14. The apparatus according to claim 8, wherein the at least two vacuum outlets is disposed on a front half of the tank, and wherein at least one other of the at least two vacuum outlets is disposed on a back half of the tank.

15. The apparatus according to claim 8, wherein the collection structure includes a pair of wings pivotally attached on opposite sides of the collection structure and movable about a vertical pivot axis to vary a width of the collection structure, the wings configured to be biased against a side-wall of an alley and moving about the vertical pivot axis in response to changes in distance between the side-wall and the collection structure.

16. The apparatus according to claim 8, wherein the collection structure includes a suction inlet in fluid communication with the vacuum inlet, the suction inlet variable in height with respect to ground level independently of a height of the collection structure.

17. The apparatus according to claim 1, wherein each of the vacuum outlets comprises a primary trap comprising a ball float for reducing the likelihood of collected liquid or semi-liquid materials exiting the tank.

18. The apparatus according to claim 14, wherein the vacuum outlets are in fluid communication with one another both outside the tank and inside the tank.

19. The apparatus according to claim 8, wherein each vacuum outlet comprises a primary trap comprising a ball float for reducing the likelihood of collected liquid or semi-liquid materials exiting the tank.

20. The apparatus according to claim 1, wherein the suction inlet comprises a lower portion with a downwardly oriented nozzle opening.

21. A mobile vacuum apparatus collecting semi-liquid animal waste materials, the apparatus comprising:
   a frame having a front and rear;
   a set of wheels mounted under the frame;
   a vacuum tank for receiving collected semi-liquid animal waste materials, the vacuum tank having (i) a vacuum inlet in a front thereof and (ii) two or more vacuum outlets spaced apart along a top thereof and in fluid communication with one another through a structure separated from the animal-waste-material-containing portion of the tank;
   collection structure comprising a scraping element mounted under the frame, the collection structure in fluid communication with the vacuum inlet, the collection structure including a suction inlet in fluid communication with the vacuum inlet, wherein the suction inlet includes a snorkel that permits air to be entrained with the collected material entering the suction inlet;
   a discharge outlet at a rear of the tank; and,
   a blower vac selectively (i) drawing air from the vacuum tank through the two or more vacuum outlets to thereby create a vacuum in the tank, or (ii) blowing air into the vacuum tank through the two or more vacuum outlets to thereby expel the collected liquid or semi-liquid materials therefrom under pressure through the discharge outlet.

* * * * *